United States Patent
Engelhardt

(10) Patent No.: US 6,614,526 B1
(45) Date of Patent: Sep. 2, 2003

(54) DEVICE FOR SIMULTANEOUSLY DETECTING SEVERAL SPECTRAL RANGES OF A LIGHT BEAM

(75) Inventor: Johann Engelhardt, Bad Schönborn (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/601,093

(22) PCT Filed: Jan. 28, 1999

(86) PCT No.: PCT/DE99/00210

§ 371 (c)(1),
(2), (4) Date: Jul. 27, 2000

(87) PCT Pub. No.: WO99/39231

PCT Pub. Date: Aug. 5, 1999

(30) Foreign Application Priority Data

Jan. 28, 1998 (DE) .......................... 198 03 151

(51) Int. Cl.⁷ .................................. G01J 3/20
(52) U.S. Cl. ........................ 356/326; 356/328
(58) Field of Search ................. 356/328, 326, 356/306, 307, 310, 334, 330

(56) References Cited

U.S. PATENT DOCUMENTS

| 3,004,465 A | 10/1961 | White | 88/14 |
|---|---|---|---|
| 4,790,654 A | * 12/1988 | Clarke | 356/310 |
| 5,343,289 A | * 8/1994 | Crawford et al. | 356/328 |
| 5,638,173 A | * 6/1997 | Smith et al. | 356/301 |
| 6,377,344 B2 | * 4/2002 | Schoeppe | 356/318 |
| 6,396,053 B1 | * 5/2002 | Yokoi | 250/234 |

FOREIGN PATENT DOCUMENTS

| DE | 44 19 940 A1 | 12/1995 |
|---|---|---|
| DE | 196 33 185 A1 | 10/1997 |
| WO | WO 92/01966 | 2/1992 |

* cited by examiner

Primary Examiner—Frank G. Font
Assistant Examiner—Layla Lauchman
(74) Attorney, Agent, or Firm—Simpson & Simpson, PLLC

(57) ABSTRACT

An apparatus for simultaneous detection of a plurality of spectral regions of a light beam (1), in particular for detection of the light beam (1) of a laser scanner (2) in the detection beam path of a confocal microscope, is characterized, in order to achieve a simple configuration with small overall size and elimination of the defocusing effect, by an arrangement (3) for spectral spreading of the light beam (1) and an arrangement (4) for splitting the spread beam (5) out of the dispersion plane (6) into spectral regions (7, 8, 9), and for subsequent detection of the split spectral regions (7, 8, 9).

32 Claims, 3 Drawing Sheets

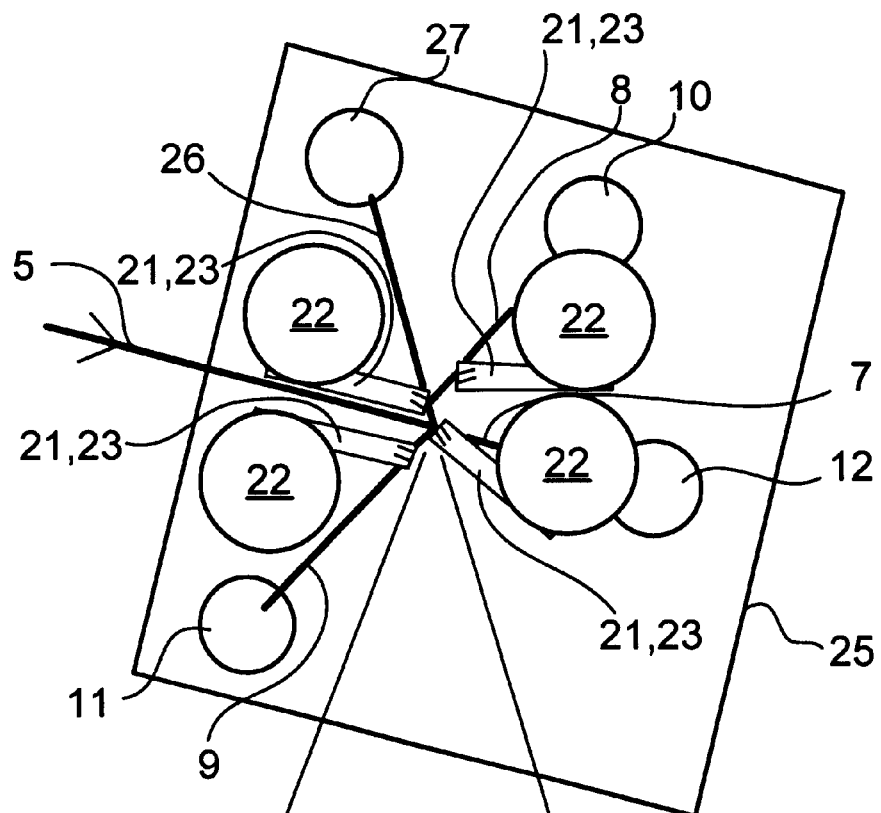
Fig. 2
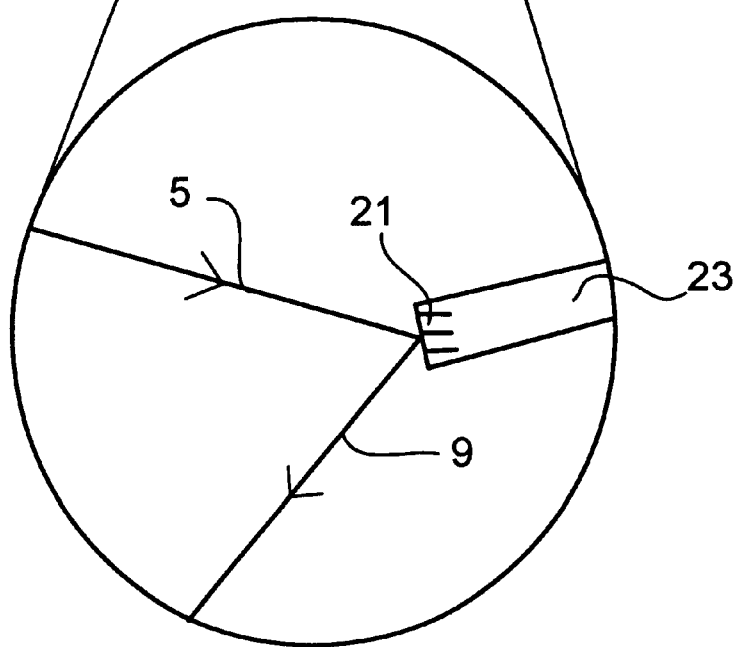

DEVICE FOR SIMULTANEOUSLY DETECTING SEVERAL SPECTRAL RANGES OF A LIGHT BEAM

CROSS-REFERENCES TO RELATED APPLICATIONS

The present application is the U.S. national phase under 35 U.S.C. 371 of International Application No. PCT/DE99/00210 filed Jan. 28, 1999 claiming priority of German Patent Application No. 198 03 151.3 filed Jan. 28, 1998.

FIELD OF THE INVENTION

The invention concerns an apparatus for simultaneous detection of a plurality of spectral regions of a light beam, in particular for detection of the light beam of a laser scanner in the detection beam path of a confocal microscope.

BACKGROUND OF THE INVENTION

Apparatuses for simultaneous detection of a plurality of spectral regions of a light beam have been known from practical use for some time, and are referred to as "multi-band detectors." These are complex optical arrangements that use an additional optical system to allow multiple focusing. Arrangements of this kind require a great deal of space for spectral multiband detection, and their resulting overall size is thus not inconsiderable. In addition, a defocusing effect often occurs therein, so that additional refocusing with the additional optical system—with reference to the respective spectral region—is necessary.

SUMMARY OF THE INVENTION

It is therefore the object of the invention to configure and develop an apparatus for simultaneous detection of multiple spectral regions of a light beam, in particular for detection of the light beam of a laser scanner in the detection beam path of a confocal microscope, in such a way that a small overall size can be achieved with a simple configuration, the intention being to avoid, to a very large extent, the defocusing effect that occurs in the existing art.

The apparatus of the generic type according to the present invention achieves the aforesaid object by way of an arrangement for spectral spreading of the light beam and an arrangement for splitting the spread beam out of the dispersion plane into spectral regions, and for subsequent detection of the split spectral regions (slit/detector arrangement).

According to the present invention, it has been recognized that simultaneous detection of a plurality of spectral regions of a light beam is readily possible if the light beam is first spectrally spread out and if a splitting of the spread beam out of the dispersion plane is then performed. Splitting of the spread beam out of the dispersion plane is accomplished, according to the present invention, by way of a particular optical arrangement, the partial beams split into spectral regions, or the spectral regions themselves, being detected simultaneously. What is essential here is that the actual splitting into spectral regions is preceded by a spreading of the light beam, so that the splitting out of the dispersion plane can be performed on the spread beam. Multiple focusing with an additional optical system is in any event not necessary here.

As already set forth, according to the present invention two optical arrangements are provided, namely one for spectral spreading of the light beam and another for splitting and subsequent detection. The arrangement for spectral spreading of the light beam can be preceded by a pinhole onto which the incoming light beam is focused; the pinhole can be directly downstream from a laser scanner. What is essential in any case is the focusing of the light beam onto the pinhole arranged in the beam path.

From there, the divergent beam proceeds to the arrangement for spectral spreading of the light beam, this arrangement comprising focusing optical systems and dispersion means. In the interest of particularly simple design, the dispersion means can be embodied as a prism. In further advantageous fashion, a respective focusing optical system, which in turn can comprise a lens arrangement, is arranged before and after the dispersion means or prism.

The divergent beam proceeding from the pinhole to the prism is focused by the focusing optical systems into the slit/detector arrangement (to be explained later), from whence the splitting into spectral regions takes place.

Particularly in the interest of small overall size, reflection means for folding back the spread beam are arranged after the arrangement for spreading the light beam; the reflection means can be a mirror-coated surface or a mirror. In any event, the fact that the spread beam is folded back at least once allows a small overall size for the apparatus as a whole.

As already mentioned earlier, the light beam can be focused into the slit/detector arrangement by way of the focusing optical systems. This slit/detector arrangement is thus arranged in the beam path of the spread beam and comprises reflective surfaces, forming slit diaphragms, which break down the spread beam, on the one hand by slit formation and on the other hand by reflection out of the dispersion plane, into a plurality of partial beams and thus image the individual spectral regions onto the corresponding detectors. In other words, the slit diaphragms provide partial transmission (corresponding to the slit width) of the beam arriving at them, and on the other hand provide reflection at the reflective surfaces provided therein, so that even with one slit diaphragm and two reflective surfaces (one reflective surface on either side to form the slit diaphragm), a breakdown into three partial beams and thus into three spectral regions is possible. This division is performed on the spread beam, out of its dispersion plane. Of course both the partial beam transmitted through the slit diaphragm and the reflected partial beam can once again strike a slit diaphragm and can be broken down there again as explained above. The division into a plurality of partial beams is thus made possible by a multiple arrangement of slit diaphragms having corresponding reflective surfaces.

The split partial beams pass directly to detectors, the number of detectors corresponding to the number of partial beams.

It is furthermore essential for the slit diaphragms provided here that they be placed or arranged approximately at the focus of the spread beam. The reflective surfaces of the slit diaphragms are embodied as mirror-coated surfaces or mirrors; the mirror-coated surfaces can, for example, be vacuum-evaporated in accordance with the support material.

With regard to a concrete embodiment of the slit diaphragms, it is advantageous if the mirror-coated surface is associated with a slit diaphragm jaw forming the slit diaphragm, and if the slit diaphragm jaw is adjustable, or movable or displaceable, in terms of its position which defines the slit diaphragm, the region of the spread beam to be reflected, and optionally the reflection angle. By adjusting the slit diaphragm jaw it is thus possible to define not only the spectral region of the transmitted partial beam and the reflected partial beam, but also the direction in which the reflected partial beams travel. The arrangement of the detectors is thus variable at least within a certain range.

Concretely, the slit diaphragm jaws could be embodied as respective cubic or, for example, also quadrangular bars having an at least partially mirror-coated surface. One of the surfaces then serves, at least partially, as a reflective surface, this being the surface adjacent to the actual slit. A solid glass element, which in accordance with the type of glass used can already offer a total reflection at its surface, is suitable for manufacture of the slit diaphragm jaw. In addition, glass is easy to process and has an extremely low coefficient of thermal expansion, so that temperature-related adjustment of the arrangement is not necessary.

In further advantageous fashion, the slit diaphragm jaws are embodied in the manner of a slider with a rotationally driven spindle and with a corresponding thread. Adjustment of the slit diaphragm jaws can thus be accomplished via actuators that cause an advance and optionally a rotation of the mirror-coated surface of the slit diaphragm jaw. Displacement of the position of the slit diaphragm jaw allows the slit width and the width of the reflected beam, and thus of the respective spectral region, to be adjusted. Adjustment of the angular position of the slit diaphragm jaw and thus the reflection angle makes possible alignment with immovably positioned detectors. The actuators can be any desired manual actuation systems. Electric motors, in particular electric motors with a fine adjustment system, advantageously serve as actuators.

Within the slit/detector arrangement, features can be provided to suppress flare, for example so-called beam traps or stops such as those sufficiently known from the existing art for flare suppression.

Any conventional detectors, preferably photomultipliers, can be used as detectors for the various spectral regions or colors. It is also possible, for example, to use commercially available CCD sensors.

In the interest of a compact design for the apparatus as a whole, it is advantageous if the arrangement for spectral spreading of the light beam and the slit/detector arrangement are carried by a single chassis that is mounted or can be fastened directly to the laser scanner. The slit/detector arrangement with the slit diaphragm jaws provided thereon could be arranged in a housing that can be handled as an insert. The insert could in turn be adjustable in terms of its position, in order to establish the incidence angle and the dispersion plane of the spread beam.

Lastly, it is also conceivable for the housing for the slit/detector arrangement to be largely thermally insulated, specifically in order effectively to eliminate thermal influences on the arrangement therein.

BRIEF DESCRIPTION OF THE DRAWINGS

There are various ways of advantageously embodying and developing the teaching of the present invention. Reference is made, for that purpose, to the explanation below of an exemplary embodiment of the invention with reference to the drawings. In conjunction with the explanation of the preferred exemplary embodiment of the invention, a general explanation is also given of preferred embodiments and developments of the teaching. In the drawings:

FIG. 2 shows, in a schematic basic depiction, the manner of operation of the slit/detector arrangement.

DETAILED DESCRIPTION OF THE INVENTION

Figure 1:
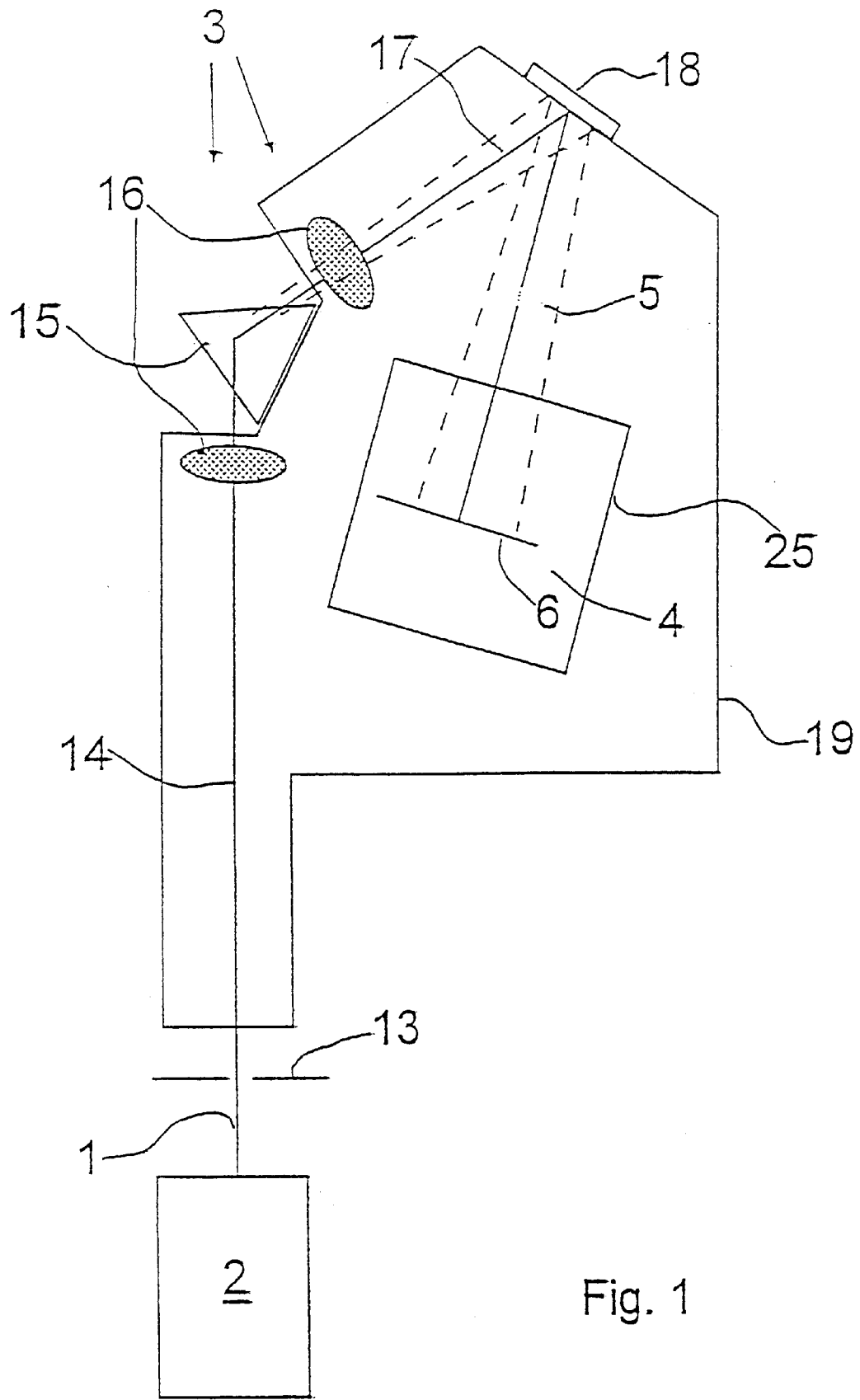
FIG. 1 shows, in a schematic depiction, an exemplary embodiment of an apparatus according to the present invention for simultaneous detection of a plurality of spectral regions of a light beam, the slit/detector arrangement being depicted therein as a "black box"

FIG. 1 shows, in a schematic depiction, an exemplary embodiment of an apparatus for simultaneous detection of a plurality of spectral regions of a light beam 1, being in this case an apparatus for detection of light beam 1 of a laser scanner 2 (indicated only schematically) in the detection beam path of a confocal microscope (not shown in the Figure).

According to the present invention, the apparatus comprises an arrangement 3 for spectral spreading of light beam 1, and an arrangement, consistently referred to hereinafter as slit/detector arrangement 4, for splitting spread beam 5 out of dispersion plane 6 into spectral regions 7, 8, 9 and for subsequent detection of the split spectral regions 7, 8, 9 by way of detectors 12, 10, 11.

FIG. 1 indicates that arrangement 3 for spectral spreading of light beam 1 is preceded by a pinhole 13 onto which the incoming light beam 1 is focused. From there, divergent light beam 14 passes to a prism 15, focusing optical systems 16 being arranged before and after prism 15. There divergent light beam 14 is focused into slit/detector arrangement 4; in order to fold back beam 17 that has been spread by prism 15, said beam first strikes a mirror 18 and from there passes into slit/detector arrangement 4 with corresponding focusing.

A means for diffracting spread beam 5, for example a transparent diffraction grating or a reflective diffraction grating, can be located in the detection beam path after arrangement 3 in place of or in addition to reflection means 18. As a further alternative, a means for refracting spread beam 5, for example a prism, can be located in the detection beam path after arrangement 3 in place of or in addition to reflection means 18.

It is further evident from FIG. 1 that both arrangement 3 for spectral spreading of light beam 1 and slit/detector arrangement 4 are associated with a chassis 19; chassis 19 can be fastened directly to laser scanner 2. This is made possible, in particular, by the compact design of the entire arrangement.

Figure 3:
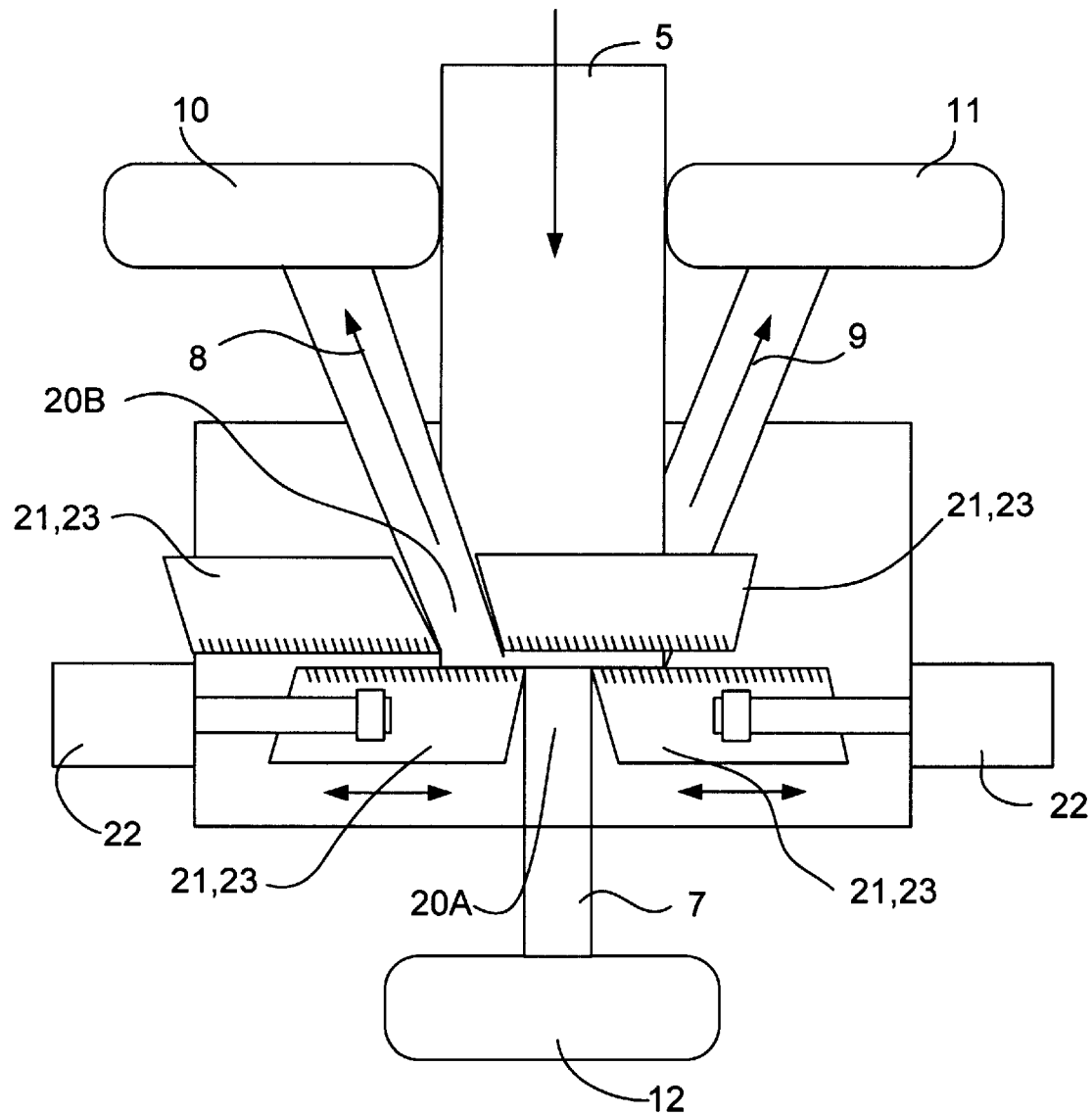
FIG. 3 shows, in a schematic depiction, one possible basic arrangement of the components of the slit/detector arrangement.

FIGS. 2 and 3 show on the one hand the basic manner of operation and on the other hand the general arrangement of the respective components within slit/detector arrangement 4.

In slit/detector arrangement 4, spread beam 17 or 5 is guided by slit diaphragm jaws 23 and mirror-coated surfaces 21 into a plurality of partial beams or spectral regions 7, 8, 9, out of dispersion plane 6, to detectors 10, 11, 12. In the depiction selected in FIG. 2, dispersion plane 6 lies perpendicular to the plane of the drawing (its projection is labeled with the reference character 5). In the depiction selected in FIG. 3, dispersion plane 6 lies in the plane of the drawing.

In the depictions in FIGS. 2 and 3, both detectors 10, 11, 12 and actuators 22, embodied as electric motors, are shown only schematically. The same is true of slit diaphragm jaws 23 forming slits 20A and B together with mirror-coated surfaces 21 that are provided directly on slit diaphragm jaws 23.

FIG. 2 furthermore shows an enlargement of a reflected spectral region 9, the reflection taking place at the mirror-coated end face of a slit diaphragm jaw 23.

FIG. 3 clearly shows that portions of spectrally spread beam 5 entering slit/detector arrangement 4 are deflected at mirror-coated surfaces 21 upward and downward to detectors 10, 11. A further partial beam or spectral region 7 passes through slit 20A and arrives at detector 12.

FIGS. 2 and 3 also show that multiple slit diaphragms can be used. By way of example, a second slit diaphragm 20B is shown in the path of reflected partial beam 8. Accordingly, an additional spectral region 26 can be detected at detector 27.

Actuators 22 allow adjustment of slits 20A and 20B between slit diaphragm jaws 23, thus making possible individual adjustment of spectral regions 7, 8, 9 whose partial beams ultimately reach detectors 12, 10, 11.

Because the incident spread beam 17 or 5 is split out of dispersion plane 6, it is possible to place slit diaphragm jaws 23 with sufficient accuracy at the focus of spread beam 17 or 5.

Lastly, be it noted that for the sake of a simplified depiction, only two of the total of four actuators 22 are depicted in FIG. 3.

PARTS LIST

1 Light beam (arriving from laser scanner)
2 Laser scanner
3 Arrangement for-spectral spreading of light beam 5
4 Slit/detector arrangement
5 Spread beam
6 Dispersion plane (of spread beam)
7 Spectral region
8 Spectral region
9 Spectral region
10 Detector
11 Detector
12 Detector
13 Pinhole
14 Divergent light beam (after pinhole)
15 Prism
16 Focusing optical systems
17 Spread beam (after prism)
18 Mirror (for folding)
19 Chassis
20 Slit
21 Mirror-coated surfaces (on slit diaphragm jaws)
22 Actuator
23 Slit diaphragm jaws
25 Housing
26 Spectral region
27 Detector

What is claimed is:

1. An apparatus for simultaneous detection of a plurality of spectral regions of a light beam comprising:
   a confocal microscope;
   a laser scanner defining a detection beam path in said confocal microscope;
   means for spectrally spreading said light beam at a dispersion plane; and,
   slit/detector means for splitting said spread beam out of said dispersion plane into a plurality of spectral regions and detecting said plurality of spectral regions.

2. The apparatus according to claim 1, further comprising a pinhole in said detection beam path before said means for spectrally spreading said light beam, wherein said light beam is focused onto said pinhole.

3. The apparatus according to claim 1, wherein said means for spectrally spreading said light beam includes a plurality of focusing optical systems in said detection beam path and means for dispersion of said light beam.

4. The apparatus according to claim 3, wherein said dispersion means includes a prism.

5. The apparatus according to claim 3, wherein said plurality of focusing optical systems includes a first focusing optical system arranged before said dispersion means and a second focusing optical system arranged after said dispersion means.

6. The apparatus according to claim 5, wherein said first and second focusing optical systems each comprise lens arrangements.

7. The apparatus according to claim 5, wherein said light beam is focused by said first and second focusing optical systems into said slit/detector means.

8. The apparatus according to claim 1, further comprising reflection means located after said means for spectrally spreading said light beam for redirecting said spread beam.

9. The apparatus according to claim 8, wherein said reflection means is a mirror.

10. The apparatus according to claim 1, further comprising diffraction means located after said means for spectrally spreading said light beam for diffracting said spread beam.

11. The apparatus according to claim 10, wherein said diffraction means is a transparent grating.

12. The apparatus according to claim 10, wherein said diffraction means is a reflective grating.

13. The apparatus according to claim 1, further comprising refraction means located after said means for spectrally spreading said light beam for refracting said spread beam.

14. The apparatus according to claim 13, wherein said refraction means is a prism.

15. The apparatus according to claim 1, wherein said slit/detector means includes a plurality of reflective surfaces spaced apart to define a slit diaphragm therebetween, whereby said spread beam is broken down into a plurality of partial beams by transmission through said slit diaphragm and reflection by said plurality of reflective surfaces out of said dispersion plane.

16. The apparatus according to claim 15, wherein said slit/detector means includes a plurality of detectors each positioned to receive a respective one of said plurality of partial beams.

17. The apparatus according to claim 15, wherein said slit diaphragm is placed approximately at the focus of said spread beam.

18. The apparatus according to claim 15, wherein said plurality of reflective surfaces is a plurality of mirror-coated surfaces.

19. The apparatus according to claim 18, wherein each of said plurality of mirror-coated surfaces is associated with a slit diaphragm jaw for positioning said mirror-coated surface, whereby said spectral region defined by transmission of a partial beam through said slit diaphragm and spectral regions defined by reflection of partial beams from said plurality of mirror-coated surfaces are adjustable.

20. The apparatus according to claim 19, wherein each said jaw enables tilting of said mirror-coated surface associated therewith to control the direction of travel of a reflected partial beam from said mirror-coated surface associated with said jaw.

21. The apparatus according to claim 19, wherein each said jaw is a quadrangular bar having an at least partially mirror-coated surface forming said mirror-coated surface.

22. The apparatus according to claim 21, wherein each said jaw is a cube having an at least partially mirror-coated surface forming said mirror-coated surface.

23. The apparatus according to claim 21, wherein each said jaw is fabricated from glass.

24. The apparatus according to claim 19, wherein each said jaw is connected by thread to a rotationally driven spindle for positioning said mirror-coated surface associated with said jaw.

25. The apparatus according to claim 20, wherein each said jaw is connected to an actuator for positioning and tilting said mirror-coated surface associated with said jaw.

26. The apparatus according to claim 25, wherein each said actuator is an electric motor.

27. The apparatus according to claim 1, wherein said slit/detector means includes a plurality of detectors for detecting said plurality of spectral regions.

28. The apparatus according to claim 27, wherein each of said plurality of detectors is a CCD sensor.

29. The apparatus according to claim 1, further comprising a chassis for carrying said means for spectrally spreading said light beam and said slit/detector means, wherein said chassis is connected directly to said laser scanner.

30. The apparatus according to claim 29, further comprising a housing for carrying said slit/detector means, wherein said housing is inserted into said chassis.

31. The apparatus according to claim 30, wherein said housing is adjustable relative to said chassis to establish an angle of incidence and said dispersion plane of said spread beam.

32. The apparatus according to claim 30, wherein said housing is thermally insulated.

* * * * *